United States Patent [19]

Shoji et al.

[11] Patent Number: 4,677,510

[45] Date of Patent: Jun. 30, 1987

[54] DATA TRANSFER APPARATUS WITH A DISKLIKE RECORD MEDIUM

[75] Inventors: Makoto Shoji, Fussa; Hiroshi Tsuyuguchi, Tokyo; Shozo Toma, Kokubunji; Kazuhiro Hiraki, Mitaka; Tsutomu Morita, Musashino, all of Japan

[73] Assignee: Teac Corporation, Tokyo, Japan

[21] Appl. No.: 699,085

[22] Filed: Feb. 7, 1985

[30] Foreign Application Priority Data

Feb. 8, 1984 [JP] Japan .................................. 59-21299
Feb. 8, 1984 [JP] Japan .................................. 59-21300

[51] Int. Cl.$^4$ ........................ G11B 17/00; G11B 5/012
[52] U.S. Cl. ........................................ 360/99; 360/97; 360/71
[58] Field of Search .............................. 360/97, 99, 71

[56] References Cited

U.S. PATENT DOCUMENTS

| 4,376,293 | 3/1983 | Teramura et al. | 360/71 |
| 4,445,155 | 4/1984 | Takahashi et al. | 360/99 |
| 4,547,820 | 10/1985 | Saito | 360/99 |

FOREIGN PATENT DOCUMENTS

| 54-610 | 1/1979 | Japan | 360/71 |
| 57-36473 | 2/1982 | Japan | |
| 57-98159 | 6/1982 | Japan | 360/99 |
| 58-1849 | 1/1983 | Japan | 360/97 |
| 58-1856 | 1/1983 | Japan | 360/99 |
| 58-121181 | 7/1983 | Japan | 360/97 |

Primary Examiner—John H. Wolff
Assistant Examiner—Matthew J. Busson
Attorney, Agent, or Firm—Woodcock, Washburn, Kurtz, Mackiewicz & Norris

[57] ABSTRACT

An apparatus for data transfer with a magnetic disk having a metal made hub attached centrally thereto, with the hub having a first opening defined centrally therein and a second opening defined eccentrically therein. The apparatus includes a turntable mounted on a drive spindle which is engageable in the first opening in the hub of the magnetic disk loaded on the turntable. A retractable drive pin is mounted eccentrically on the turntable so as to be sprung into engagement in the second opening in the disk hub upon register therewith. In order to assure engagement of the drive pin in the second opening in the disk hub immediately upon loading of the magnetic disk on the turntable, a disk drive motor for driving the turntable via the drive spindle is connected to a supply terminal via a power control switch. When the magnetic disk is loaded on the turntable while power is being supplied from the supply terminal, a switch control circuit closes the power control switch, for causing the rotation of the turntable relative to the magnetic disk, for a preassigned length of time sufficient for the drive pin to become engaged in the second opening in the disk hub. The magnetic disk can therefore be set into rotation for immediate commencement of data transfer upon delivery of a "motor on" signal from host equipment to the power control switch.

3 Claims, 9 Drawing Figures

DATA TRANSFER APPARATUS WITH A DISKLIKE RECORD MEDIUM

BACKGROUND OF THE INVENTION

Our invention relates to an apparatus for data transfer with interchangeable disklike record media such as flexible magnetic disks which may be packaged in cassette or cartridge form. More specifically, our invention dealas with such an apparatus for use with a flexible magnetic disk or or the like having a first opening defined centrally therein for receiving a drive spindle on a turntable included in the apparatus, and a second opening defined eccentrically therein for receiving a retractable drive pin arranged eccentrically on the turntable.

The above defined type of flexible magnetic disk and an associated data transfer apparatus or disk drive have both been suggested by Sony Corporation., of Tokyo, Japan, as disclosed in Japanese Laid Open Patent Application 57-36473, laid open to public inspection on Feb. 27, 1982, and in corresponding U.S. Pat. No. 4,445,155 issued Apr. 24, 1984. This known flexible magnetic disk has a diameter of 3.5 inches (86 millimeters) and is rotatably housed in generally flat, boxlike envelope of relatively rigid plastics material to make up a disk cassette. Aside from its size, the magnetic disk differs from more conventional ones in having a metal made center hub to be placed concentrically on a motor driven turntable included in the associated data transfer apparatus. The hub has a central hole for receiving the spindle projecting from the turntable, and an eccentric slot for receiving a retractable, spring energized drive pin mounted eccentrically on the turntable.

A problem with this type of magnetic disk and data transfer apparatus for use therewith is the engagement of the spindle and drive pin in the respective opening in the disk hub. Of course, the spindle finds ready engagement in the center hole in the disk hub as the magnetic disk is loaded concentrically on the turntable. Except in very rare cases, however, the drive pin is out of register with the eccentric slot in the hub of the magnetic disk when the latter is placed on the turntable, and so does not become engaged therein unless the turntable is revolved relative to the disk.

Consequently, when the disk drive motor is subsequently set into rotation, as in response to a "motor on" signal from host equipment controlling the data transfer apparatus, the magnetic disk starts rotation with some delay, only after the engagement of the drive pin in the eccentric slot in the disk hub. Such delay that has been unavoidable in the conventional data transfer apparatus of this class has correspondingly retarded the commencement of data transfer between the magnetic disk and the transducer heads in response to the "motor on" signal. Furthermore, even if the magnetic disk is once properly engaged with both the spindle and the drive pin on the turntable, it has been possible that the magnetic disk be displaced out of proper engagement therewith when the power switch is opened, or by external shocks during the nonsupply of power. In that case a delay in the start of data transfer has occurred again when, with the power switch reclosed subsequently, the disk drive motor is set into rotation in response to the "motor on" signal.

SUMMARY OF THE INVENTION

We have succeeded in eliminating the delay in the start-up of the rotation of the magnetic or like data storage disk of the type in question and thus in achieving the immediate commencement of data transfer between the disk and the associated disk drive apparatus.

Our invention may be summarized as a data transfer apparatus for use with a replaceable data storage disk of the type under consideration, comprising a turntable with a center spindle to be engaged in the first opening in the hub of the data storage disk and a retractable, eccentric drive pin biased, as by a spring, for engagement in the second opening in the disk hub. The turntable is driven by a disk drive motor, which is connected to a power supply terminal via a power control switch thereby to be turned on and off. The apparatus further includes a disk detector for sensing the loading of the data storage disk on the turntable. The output from this disk detector is fed to a switch control circuit, which responds to the disk detector output by closing, upon loading of the data storage disk on the turntable, the power control switch for a preassigned length of time sufficient for the drive pin to become engaged in the second opening in the hub of the loaded data storage disk.

When the data storage disk is initially loaded on the turntable, with the spindle received in the center opening in its hub, the drive spindle will in all likelihood be out of register with the eccentric opening in the disk hub and so will be retracted into the turntable by the disk hub against the bias of the spring or the like. As the turntable is then automatically revolved for the preassigned length of time relative to the data storage disk, the drive pin will be sprung into engagement in the eccentric opening in the disk hub. The data storage disk can thus be immediately set into rotation at a required speed when the disk drive motor is subsequently energized for data transfer, as in response to a "motor on" signal from host equipment.

The above and other features and advantages of our invention and the manner of realizing them will become more apparent, and the invention itself will best be understood, from a study of the following description and appended claims, with reference had to the attached drawings showing a preferred embodiment of our invention.

BRIEF DESCRIPTION OF THE DRAWINGS

FIG. 8 is a series of waveform diagrams useful in explaining the operation of the data transfer apparatus in accordance with our invention, the waveforms being plotted on the assumption that the disk cassette of FIGS. 1 through 3 has already been loaded on the turntable when the apparatus is electrically turned on; and FIG. 9 is also a series of waveform diagrams similar to FIG. 8 except that the waveforms are plotted on the assumption that the disk cassette is loaded on the turntable after the apparatus has been electrically turned on.

DESCRIPTION OF THE PREFERRED EMBODIMENT

Figure 1:
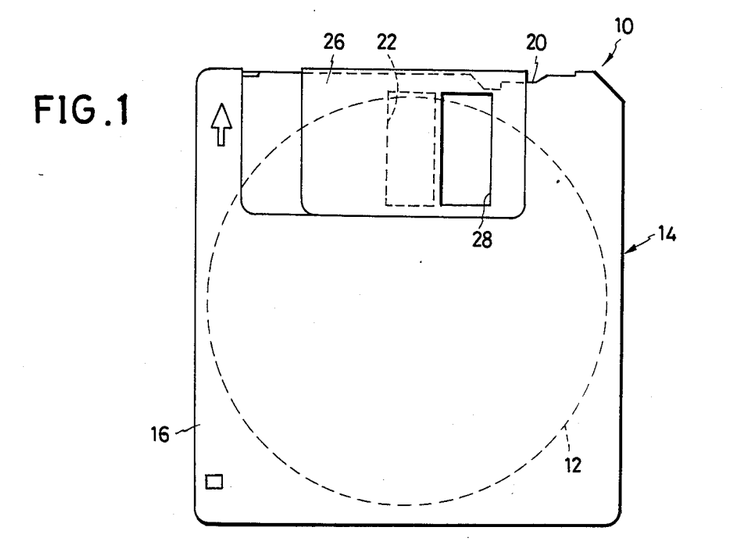
FIG. 1 is a top plan view of a flexible magnetic disk cassette for use with the data transfer apparatus in accordance with our invention, with the sliding shutter of the disk cassette shown closed.
Figure 2:
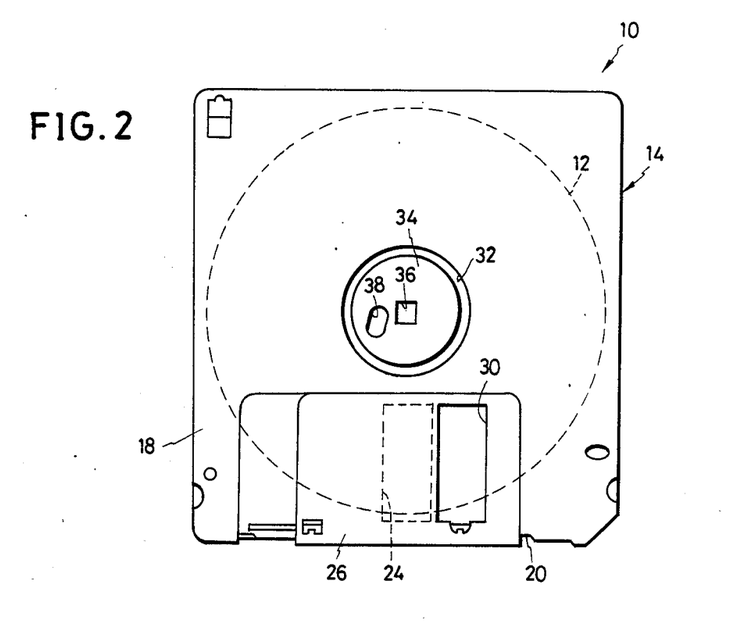
FIG. 2 is a bottom plan view of the disk cassette of FIG. 1.
Figure 3:
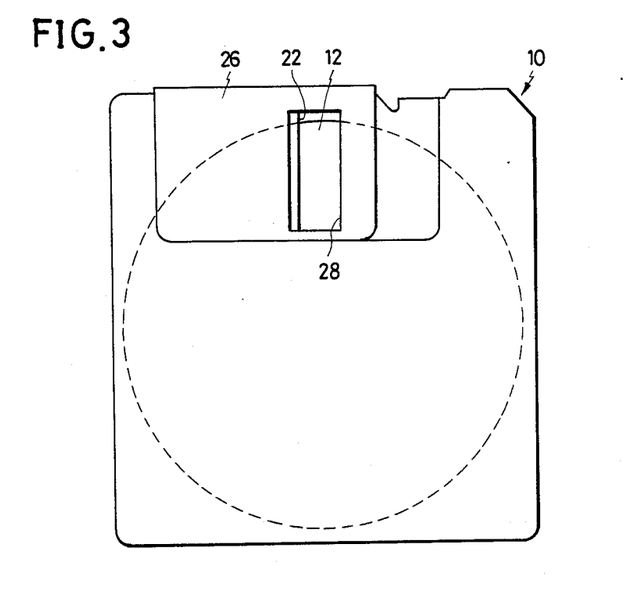
FIG. 3 is a view similar to FIG. 1 except that the sliding shutter of the disk cassette is shown opened to expose parts of the magnetic disk.

The data transfer apparatus in accordance with our invention is particularly well suited for use with the flexible magnetic disk cassette illustrated in FIGS. 1 through 3 and therein generally designated 10. With particular reference to FIGS. 1 and 2 the exemplified disk cassette has a flexible magnetic disk 12, with a 3.5 inch diameter, housed in a protective envelope 14 of relatively rigid plastics material. The envelope 14 is of generally flat, approximately square boxlike shape, comprising a pair of opposite main sides 16 and 18 oriented parallel to the magnetic disk 12. The disk cassette 10 is to be loaded horizontally in the associated disk drive or data transfer apparatus, to be set forth presently, with its side 16 directed upwardly and with its edge 20 foremost. We will therefore hereinafter refer to the side 16 as the top side, the other side 18 as the bottom side, and the edge 20 as the front edge.

Formed in both top 16 and bottom 18 sides of the envelope 14, in the vicinity of its front edge 20, are apertures 22 and 24 to expose radial portions of the opposite surfaces of the magnetic disk 12 for data transfer contact with a pair of transducer heads, yet to be described, of the data transfer apparatus. Normally, the apertures 22 and 24 are held closed by a sliding shutter 26 in the form of a sheet of aluminum, stainless steel or like material bent into the shape of a U to fit over the front edge 20 of the envelope 14. The shutter 26 has itself two apertures 28 and 30 which are out of register with the envelope apertures 22 and 24 when the shutter is in the normal or right hand position of FIGS. 1 and 2 under the bias of a spring (not shown). When the disk cassette 10 is loaded fully into the data transfer apparatus, the shutter 26 will be forced leftwardly by a shutter opening lever included in the apparatus against the bias of the unshown spring. Thereupon, as illustrated in FIG. 3, the shutter 26 will bring its apertures 28 and 30 into register with the envelope apertures 22 and 24, respectively, thereby exposing the radial portions of the opposite faces of the magnetic disk 12 for data transfer contact with the transducer heads of the data transfer apparatus 10.

The magnetic disk cassette 10 is to be placed upon the turntable of the data transfer apparatus with the top side 16 of its envelope 14 oriented upwardly. Thus, as seen in FIG. 2, the bottom side 18 of the envelope 14 has a circular opening 32 defined centrally therein to allow engagement of the magnetic disk 12 with the turntable. Exposed through the central opening 32 is a hub 34 in the form of a disk of magnetic sheet metal attached centrally to the magnetic disk 12. The hub 34 has a first opening in the form of a square hole 36 defined centrally therein, and a second opening in the form of a short slot 38 defined eccentrically therein.

Figure 4:
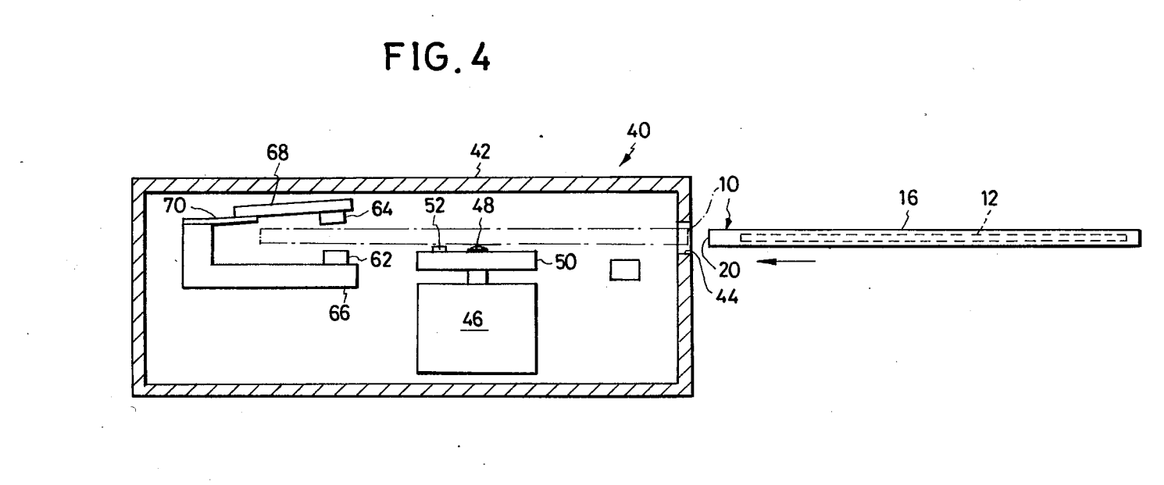
FIG. 4 is a vertical section through the data transfer apparatus for use with the disk cassette of FIGS. 1 through 3, with the internal construction of the apparatus being shown diagrammatically to an extent necessary for a full understanding of our invention.

We have diagrammatically illustrated in FIG. 4 the general organization of the data transfer apparatus 40, for use with the magnetic disk cassette 10 of FIGS. 1 through 3, in accordance with our invention. The data transfer apparatus 40 has a generally boxlike housing 42 having an entrance slot or opening 44 defined therein. As depicted also in this figure, the disk cassette 10 is to be inserted in the entrance slot 44 with its front edge 20 foremost and with its top side 16 directed upwardly. Within the housing 42 there is provided a disk drive motor 46 which is preferably of the known rotor outside stator configuration; that is, the rotor is arranged outside the stator for joint rotation with an output shaft serving as a spindle 48 on which a turntable 50 is directly mounted in a coaxial relation thereto.

Figure 5:
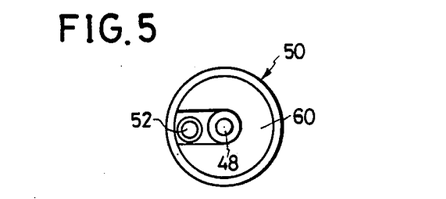
FIG. 5 is a top plan view of the turntable in the data transfer apparatus of FIG. 4, shown together with the spindle and drive pin thereon.
Figure 6:
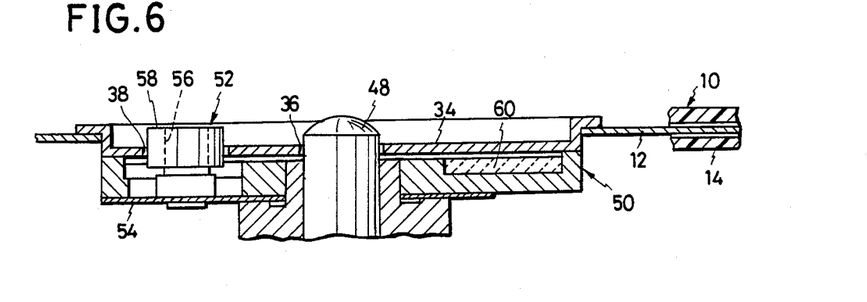
FIG. 6 is an enlarged axial section through the turntable of FIG. 5, the view also showing fragmentarily the disk cassette of FIGS. 1 through 3 mounted in position on the turntable in proper engagement therewith.

As better illustrated in FIGS. 5 and 6, the spindle 48 partly projects upwardly of the turntable 50 for engagement in the center hole 36 in the hub 34 of the magnetic disk 12 of the disk cassette 10. A retractable drive pin 52 is mounted eccentrically on the turntable 50 for engagement in the eccentric slot 38 in the disk hub 34. The drive pin 52 is supported by the turntable 50 via a leaf spring 54 which allows retraction of the drive pin into the turntable 50, in a direction parallel to the axis of the spindle 48. The drive pin 52 is shown to comprise an upstanding shaft 56 on the leaf spring 54, and a roll 58 rotatably mounted thereon. Also mounted on the turntable 50 is a permanent magnet 60 of substantially annular shape for attracting the metal made hub 34 of the magnetic disk 12.

With reference back to FIG. 4 the data transfer apparatus 40 further includes a pair of magnetic transducer heads 62 and 64 arranged within the housing 42 for data transfer contact with the opposite faces of the magnetic disk 12 through the apertures 22 and 24 in its envelope 14 and the apertures 28 and 30 in the sliding shutter 26. The lower transducer head 62 is mounted directly on a carriage 66, whereas the upper transducer head 64 is mounted on this carriage via a support arm 68 and a cantilever spring 70. The carriage 66 is reciprocably movable for transporting the pair of transducer heads 62 and 64 radially of the magnetic disk 12 for track to track accessing in the well known manner.

When initially inserted in the data transfer apparatus 40 through its entrance slot 44, the disk cassette 10 is to occupy the phantom position of FIG. 4, a slight distance over the turntable 50, in which the magnetic disk 12 is in axial alignment with the turntable. Then the disk cassette 10 is lowered onto the turntable 50, either manually or automatically by a cassette transport mechanism disclosed, for example, in U.S. patent application Ser. No. 676,005, now U.S. Pat. No. 4,604,666, filed by Kitahara et al. on Nov. 30, 1984. The spindle 48 will then be engaged in the center hole 36 in the disk hub 34 of the lowered disk cassette 10. The drive pin 52, however, will most likely be not engaged in the eccentric slot 38 in the disk hub 34; instead, the drive pin will be depressed into the turntable 50, both under the weight of the magnetic disk 12 and by the attractive force of the permanent magnet 60 on the turntable, against the force of the leaf spring 54. The turntable 50 must be revolved relative to the magnetic disk 12 by the disk drive motor 46 for the engagement of the drive pin 52 in the eccentric slot 38 in the disk hub 34. The drive pin 52 will engage in the eccentric slot 38 under the force of the leaf spring 54 when the drive pin reaches a position of register with the eccentric slot.

Figure 7:
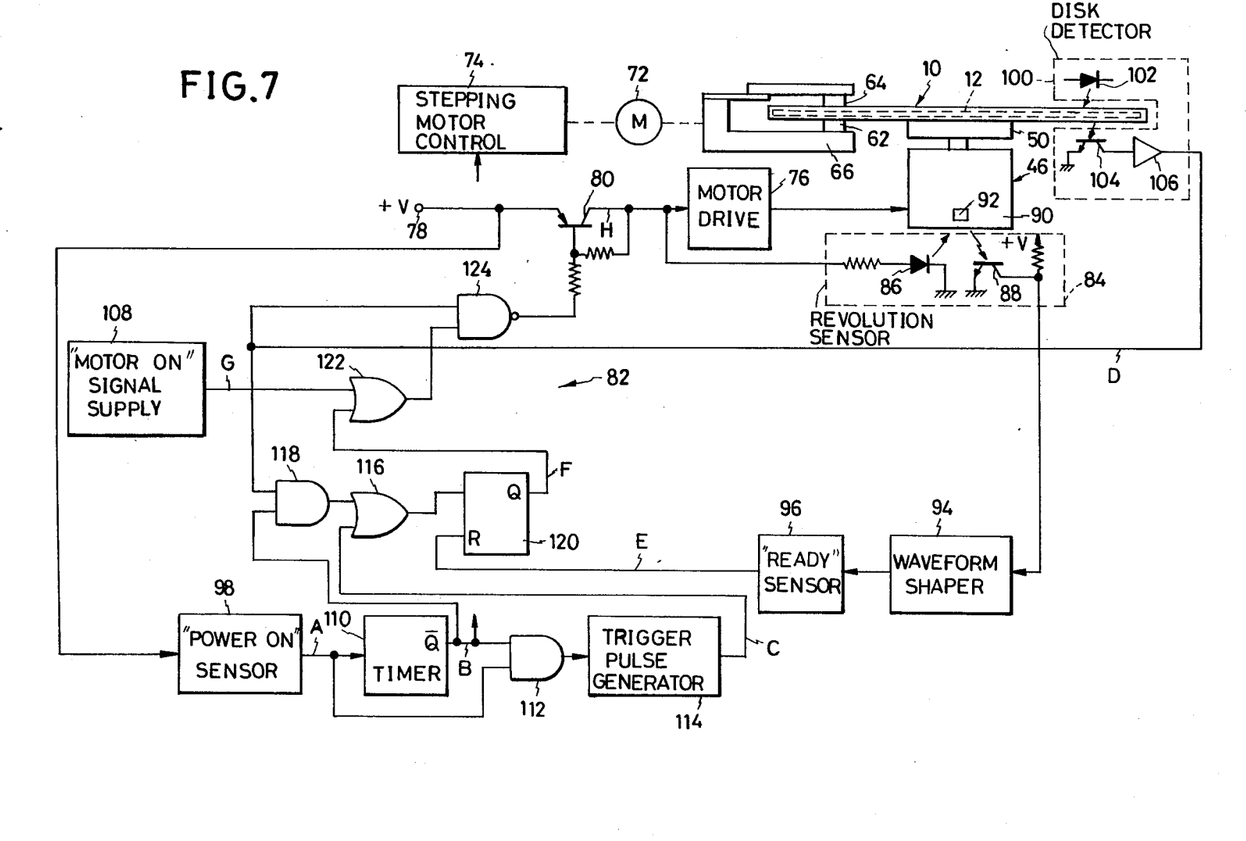
FIG. 7 is a block diagram of the electrical configuration of the data transfer apparatus of FIG. 4, incorporating the novel concepts of our invention.

Shown in FIG. 7 is the electrical circuitry incorporated in the data transfer apparatus 40 for automatically setting the disk drive motor 46 into rotation for a length of time sufficient to cause engagement of the drive pin 52 in the eccentric slot 38 in the disk hub 34 upon loading of the disk cassette 10 in the apparatus.

FIG. 7 also shows the disk cassette 10 mounted in place on the turntable 50, with its magnetic disk 12 caught between the pair of transducer heads 62 and 64 for data transfer therewith. Employed for driving the carriage 66, carrying the transducer heads 62 and 64, is a stepping motor 72 which is coupled to the carriage via a suitable rotary to linear converter, not shown, such as the familiar steel belt bent into the approximate shape of the Greek alpha. Preferably, the stepping motor 72 is of the four phase construction, energized in the single phase drive mode from its control circuit 74. However, when the power switch, not shown, of the data transfer system comprising the apparatus 40 and its host equipment, also not shown, is closed, not only the first phase windings but also at least either of the second to fourth phase windings of the stepping motor 72 may be energized in order to prevent its rotor from becoming stationary in its angular position opposite the third phase windings. The pair of transducer heads 62 and 64 will then positively return to the "track zero" positions on the magnetic disk 12 on the turntable 50 upon closure of the power switch, although this manner of stepping motor operation constitutes no essential feature of our present invention.

The disk drive motor 46 is electrically connected to and operated by a drive circuit 76. This drive circuit is connected to a direct current power supply terminal 78 via a power control switch herein shown as a switching transistor 80. We will hereinafter refer to this transistor as the power control transistor. Power is supplied from the supply terminal 78 upon closure of the unshown power switch of the data transfer system. Because of the provision of the power control transistor 80, however, the disk drive motor 46 is not set into operation unless conduction is caused through the power control transistor by a switch control circuit, generally designated 82, to which we will refer subsequently.

The reference numeral 84 generally denotes a revolution sensor associated with the disk drive motor 46 and employed for sensing the angular orientation of the magnetic disk 12 on the turntable 50 and the speed of its rotation. The revolution sensor 84 comprises a light source such as a light emitting diode (LED) 86 and a photodetector such as a phototransistor 88. The LED 86 sheds light onto the rotor 90 of the disk drive motor 46, and the phototransistor 88 receives the light that has been reflected by a reflector 92 in a prescribed position on the rotor. The angular position of the reflector 92 on the disk drive motor rotor 90 has a predetermined relation to that of the drive pin 52 on the turntable 50. It is therefore possible to ascertain, upon engagement of the drive pin 52 in the eccentric slot 38 in the disk hub 34, the angular orientation of of the magnetic disk 12 from the output from the revolution sensor 84. Preferably, and as shown, the LED 86 is connected to the supply terminal 78 via the power control transistor 80 and, in consequence, is powered only during the energization of the disk drive motor 46 in order to avoid waste of power.

The output of the revolution sensor 84, or of its phototransistor 88, is connected to a shaping circuit 94. It is the office of the shaping circuit 94 to put out discrete pulses representative of the detections of the reflector 92 on the disk drive motor rotor 90 by the revolution sensor 84. It is possible to determine the angular orientation of the magnetic disk 12 on the turntable 50 from the relative positions of the output pulses of the shaping circuit 94, and the speed of revolution of the magnetic disk from the spacings between the shaping circuit output pulses.

Connected to the output of the shaping circuit 94 is a "ready" sensor circuit 96 which, in response to the output pulses of the shaping circuit, puts out a signal indicative of the fact that the magnetic disk 12 on the turntable 50 is ready for data transfer with the pair of transducer heads 62 and 64. The output signal of the "ready" sensor circuit 96 goes high upon lapse of a preassigned length of time from the beginning of the rotation of the disk drive motor 46 and when its speed of rotation exceeds 90 percent of the normal speed.

Besides being connected to the power control transistor 80, the supply terminal 78 is connected to a "power on" sensor circuit 98 for sensing the supply of power from the supply terminal 78. When the supply voltage builds up to, say, 90 percent of the normal operating value following the closure of the power switch, the "power on" sensor circuit 98 senses the fact by a voltage comparator included therein, whereupon its output goes high.

At 100 is shown a disk detector for sensing the loading of the magnetic disk cassette 10 on the turntable 50 or into the data transfer apparatus 40. The disk detector 100 comprises a light source 102 disposed one one side of the magnetic disk cassette 10 on the turntable 50, a photodetector 104 to be irradiated by the light source, and an amplifier 106 for amplifying the output from the photodetector. The output from the disk detector 100 goes high upon loading of the disk cassette 10 on the turntable 50.

We have named a "motor on" signal supply circuit 108 for the convenience of disclosure; in practice, it may be part of host equipment controlling this data transfer apparatus 40. The "motor on" signal supply circuit 108 supplies a "motor on" signal which goes high for setting the disk drive motor 46 into rotation for data transfer between magnetic disk 12 and transducer heads 62 and 64.

In this particular embodiment the aforesaid switch control circuit 82 responds to all of the outputs from the "ready" sensor circuit 96, "power on" sensor circuit 98, disk detector 100, and "motor on" signal supply circuit 108 for the on off control of the power control transistor 80. The switch control circuit 82 incldues a timer 110 connected between the output of the "power on" sensor circuit 98 and an input of a two input AND gate 112. The other input of the AND gate 112 is connected directly to the output of the "power on" sensor circuit 98. The output of the AND gate 112 is connected to a trigger pulse generator 114 and thence to an input of a two input OR gate 116. Connected to the other input of this OR gate 116 is an AND gate 118 having its two inputs connected respectively to the timer 110 and to the disk detector 100. The output of the OR gate 116 is connected to an input of a flip flop 120, the reset input R of which is connected to the "ready" sensor circuit 96. The flip flop 120 is of a known configuration such that it can be rest when its reset input goes high, even if the output from the disk detector 100 is then high. The flip flop 120 has its Q output connected to an input of a two input OR gate 122, the other input of which is connected to the "motor on" signal supply circuit 108. The OR gate 122 has its output connected to an input of a two input open collector NAND gate 124, the other input of which is connected to the disk detector 100. The NAND gate 124 has its output connected to the base of the power control transistor 80 for causing controlled conduction therethrough.

OPERATION

Figure 8:
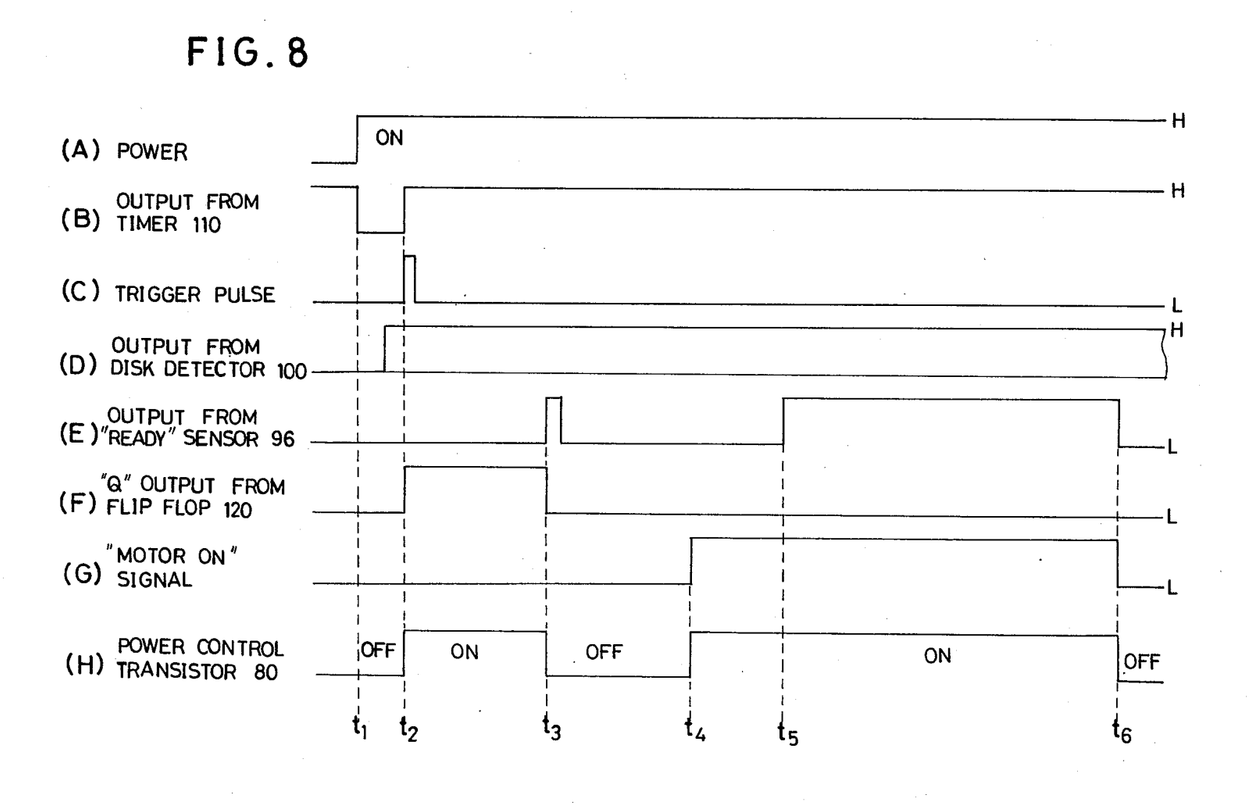
Figure 9:
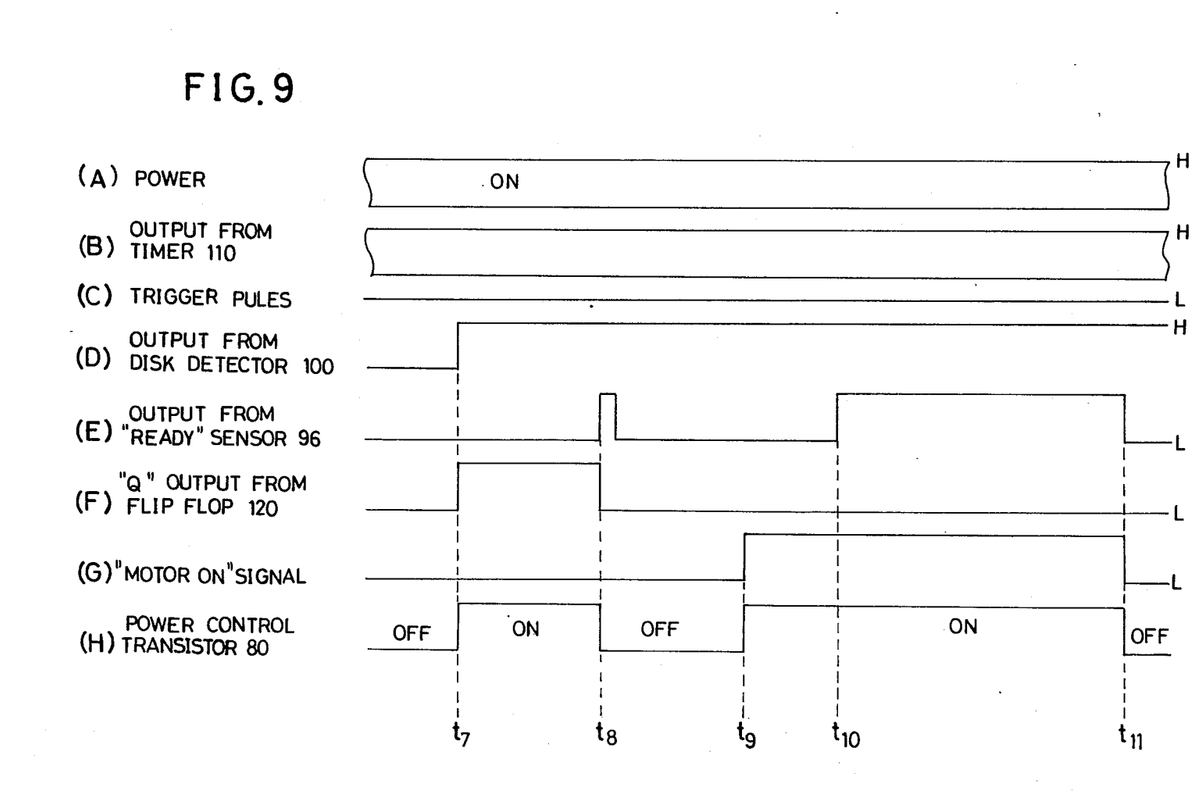

We will now proceed to the operational description of the data transfer apparatus 40, with reference directed also to the waveform diagrams of FIGS. 8 and 9. We have drawn the waveforms of FIG. 8 on the assumption that the disk cassette 10 has been loaded into the data transfer apparatus 40 when the power switch is closed, and the waveforms of FIG. 9 on the assumption that the disk cassette is loaded into the apparatus after the power switch has been closed. Further, to facilitate understanding, we have indicated in FIG. 7 the lines on which the waveforms (A) through (H) of FIGS. 8 and 9 appear, by the same capitals.

Let it first be assumed that the data transfer apparatus is powered on after the disk cassette 10 has been placed on the turntable 50, with the spindle 48 received in the center hole 36 in the disk hub 34 but with the drive pin 52 out of engagement in the eccentric slot 38 in the disk hub. As the output from the "power on" sensor circuit 98 consequently goes high (H) at a moment t1 as at (A) in FIG. 8, the output from the timer 110, which is normally high, goes low (L) and remains low for a preassigned length of time (e.g. 12 milliseconds) until a moment t2 as at (B) in FIG. 8. This low level period of the timer output is necessary for positively returning the pair of transducer heads 62 and 64 to the "track zero" positions on the magnetic disk 12 through multiphase energization of the single phase drive stepping motor 72, as taught in Shoji et al. U.S. patent application Ser. No. 588,677, filed Mar. 12, 1984.

The outputs from the "power on" sensor circuit 98 and the timer 110 are both directed into the AND gate 112. As will be seen from a consideration of (A) and (B) in FIG. 8, the AND gate 112 allows the passage of the high level output from the "power on" sensor circuit 98 only after the moment t2 when the output from the timer 110 goes high.

As the output from the AND gate 112 goes high at the moment t2 as above, the trigger pulse generator 114 responds by putting out a trigger pulse as at (C) in FIG. 8, for delivery to the OR gate 116. This OR gate also receives the output from the AND gate 118.

If the disk cassette 10 has already been loaded on the turntable 50 when the power switch is closed, as we have assumed in connection with FIG. 8, then the output from the disk detector 100 goes high shortly after the moment t1 and before the moment t2. This disk detector output is directed into the AND gate 118, which also directly receives the output from the timer 110, which output remains low from moment t1 to moment t2 as aforesaid. Consequently, the output from the AND gate 118 does not go high in direct response to the high output from the disk detector 100 but does so only at the moment t2 when the output from the timer 110 goes high.

The flip flop 120 is therefore set at the moment t2, as at (F) in FIG. 8, by the output from the OR gate 116.

The resulting high output from the flip flop 120 is fed to the OR gate 122, which is also supplied with the "motor on" signal from the "motor on" signal supply circuit 108. As indicated at (G) in FIG. 8, the "motor on" signal still remains low, so that the high output from the flip flop 120 passes the OR gate 122 on to the NAND gate 124. This NAND gate also receives the output from the disk detector 100. Accordingly, only when the output from the disk detector 100 is high, the output from the NAND gate 124 goes low in response to the high output from the OR gate 122. Since the output from the disk detector 100 has already gone high, as we have mentiond in connection with (D) in FIG. 8, the NAND gate 124 actuates the power control transistor 80 to cause conduction therethrough at the moment t2 as at (H) in FIG. 8.

Powered from the supply terminal 78 via the power control transistor 80, the motor drive circuit 76 starts energizing the disk drive motor 46. The turntable 50 rotates with the disk drive motor 46 relative to the magnetic disk 12 of the disk cassette 10 on the turntable. The LED 86 of the revolution sensor 84 is also powered from the supply terminal 78 via the power control transistor 80, so that the revolution sensor starts sensing the revolution of the disk drive motor 46 at the moment t2. The drive pin 52 on the turntable 50 will certainly become engaged in the eccentric slot 38 in the disk hub 34 by the time the output from the "ready" sensor circuit 96 goes high at a moment t3 as at (E) in FIG. 8. The high output from the "ready" sensor circuit 96 resets the flip flop 120 as at (F) in FIG. 8, with the result that the NAND gate 124 terminates conduction through the power control transistor 80. Thus the disk drive motor 46 is set out of rotation, and the LED 86 of the revolution sensor 84 is also deenergized, for saving power.

The "motor on" signal from the "motor on" signal supply circuit 108 is shown to go high at a subsequent moment t4 at (G) in FIG. 8. The "motor on" signal passes the OR gate 122 on to the NAND gate 124. The output from the disk detector 100, also fed to the NAND gate 124, is still high, as at (D) in FIG. 8, so that the NAND gate again causes conduction through the power control transistor 80, as at (H) in FIG. 8. Thereupon the disk drive motor 46 is set into rotation, and the LED 86 of the revolution sensor 84 is also energized.

Since the turntable 50 with its drive pin 52 has already established proper driving engagement with the magnetic disk 12 during the period from moment t2 to moment t3, will be immediately set into rotation upon energization of the disk drive motor 46. Data transfer between magnetic disk 12 and transducer heads 62 and 64 is initiated as the output from the "ready" sensor circuit 96 goes high at a moment t5 shortly after the moment t4. Although this high output from the "ready" sensor circuit 96 enters the reset input R of the flip flop 120, the NAND gate 124 continues actuating the power control transistor 80 since the "motor on" signal remains high. The power control transistor 80 is deactuated to set the disk drive motor 46 out of rotation at a moment t6, as at (H) in FIG. 8.

The disk cassette may be unloaded from the data transfer apparatus 40 before the moment t6, that is, while the "motor on" signal is still high. Then, as the output from the disk detector 100 goes low, the output from the NAND gate 124 goes high to discontinue conduction through the power control transistor 80. The the disk drive motor 46 and the LED 86 of the revolution sensor 84 are thus both deenergized to avoid waste of power. It will be understood that the power control transistor 80 opens upon withdrawal of the disk cassette 10 from the data transfer apparatus 40 regardless of whether the "motor on" signal is high or low.

We will now explain the operation of the data transfer apparatus 40 when the disk cassette 10 is loaded therein after the power switch is closed. In FIG. 9, therefore, power is being supplied as at (A), the output from the timer 110 has already gone high as at (B), and the output from the trigger pulse generator 114 has already become low as at (C). Upon loading of the disk cassette 10, the output from the disk detector 100 goes high at a moment t7, as at (D) in FIG. 9. Since the output from the timer 110 is already high, the high output from the disk detector 100 immediately sets the flip flop 120 as at (F) in FIG. 9. The resulting high outer from the flip flop 120 is directed via the OR gate 122 to the NAND gate 124. Receiving the high outputs from both disk detector 100 and flip flop 120, the NAND gate 124 causes conduction through the power control transistor 80, thereby allowing the same to conduct power from the supply terminal 78 on to the disk drive motor 46 and the LED 86. The turntable 50 revolves with the disk drive motor 46 for the establishment of driving engagement of the drive pin 52 in the eccentic slot 38 in the magnetic disk 12.

As the "ready" sensor circuit 96 puts out a "ready" pulse at a subsequent moment t8, as at (E) in FIG. 9, the flip flop 120 is thereby reset as at (F) in FIG. 9. Then the power control transistor 80 is deactuted as at (H) in FIG. 9 to suspend the energization of the disk drive motor 46 and the LED 86, thereby saving power.

The "motor on" signal is shown to go high at a subsequent moment t9, as at (G) in FIG. 9, with the result that the power control transistor 80 again becomes conductive as at (H) in FIG. 9. Since the turntable 50 is already in proper driving engagement with the magnetic disk 12, the latter will quickly attain a rotative speed required for data transfer. Data transfer will be initiated as the output from the "ready" sensor circuit 96 goes high at a moment t10, and will be terminated when the "motor on" signal goes low, or when the disk cassette 10 is unloaded from the apparatus, at a moment t11.

As is evident from the foregoing disclosure, this embodiment of our invention gains the following advantages:

1. The driving engagement of the turntable with the magnetic disk is established automatically as the disk cassette is loaded on the turntable, either before or after the apparatus is electrically switched on, so that the data transfer between disk and heads starts faster in response to the "motor on" signal from heretofore.

2. The energization of the disk drive motor for the attainment of the driving engagement of the turntable with the magnetic disk is suspended automatically, rather than continued until the "motor on" signal goes high, in response to the "ready" sensor output signal for saving power.

3. The light source of the revolution sensor is also energized and deenergized together with the disk drive motor to further enhance the power saving capability of the apparatus.

4. Although the stepping motor 72 may be usually powered from the supply terminal 78, the simultaneous flow of starting current to both stepping motor and disk drive motor is avoided as the timer 110 introduces a delay in setting the flip flop 120 in response to the output from the "power on" sensor circuit 98, making it possible to correspondingly reduce the capacity of the supply circuit connected to the supply terminal 78.

POSSIBLE MODIFICATIONS

We wish to have it understood that the above detailed disclosure is meant purely to illustrate or explain and not to impose limitations upon our invention, since a variety of modifications will readily occur to one skilled in the art on the basis of this disclosure, without departing from the broader scope of this invention. The following, then, is a brief list of such possible modifications:

1. Only either of the disk detector 100 and the trigger pulase generator 114 could be connected to the set input of the flip flop 120.

2. The revolution sensor 84 could be composed of a permanent magnet affixed to the rotor 90 of the disk drive motor 46, and a fixed magnetoelectric converter such as a Hall effect device acted upon by the magnet, with the magnetoelectric converter electrically turned on and off by the powr control transistor 80 or by equivalent means.

3. The loading of the disk cassette could be detected by a Microswitch (trade name) or the like, rather than photoelectrically as in the illustrated embodiment.

4. The resetting of the flip flop 120 by the output from the "ready" sensor circuit 96 is not essential; instead, a timer may be provided which resets the flip flop upon lapse of a predetermined length of time (e.g. 420 milliseconds), sufficient for the establishment of driving engagement between turntable and magnetic disk, after the flip flop has been set.

5. An additional means could be employed for positively clamping the magnetic disk onto the turntable.

6. The angular orientation and rotative speed of the magnetic disk might be ascertained from an index hole defined in the disk.

7. The timer 110 may be omitted if the power supply in use is of large capacity, or if the energization of the stepping motor 72 is unnecessary when the apparatus is electrically turned on; in that case, the flip flop 120 will be set immediately upon closure of the power switch.

We claim:

1. A data transfer apparatus for use with a replaceable data storage disk cassette or cartridge having a data storage disk rotatably received in a protective envelope, the data storage disk having centrally attached thereto a hub of magnetic material having defined therein a first opening located centrally of the data storage disk and a second opening located eccentrically of the data storage disk, both first and second openings being exposed through an aperture in the protective envelope, the data transfer apparatus comprising:

(a) a turntable on which the data storage disk is to be placed concentrically, the turntable being capable of magnetically attracting the hub of the data storage disk;

(b) a drive spindle coaxially coupled to the turntable and having a portion projecting therefrom for engagement in the first opening in the hub of the data storage disk;

(c) a drive pin mounted eccentrically on the turntable for movement between a working position, where the drive pin is in engagement in the second opening in the hub of the data storage disk on the turntable for transmitting the rotation of the turntable to the data storage disk, and a retracted position where the drive pin is out of engagement with the second opening in the hub of the data storage disk on the turntable;
(d) resilient means biasing the drive pin from the retracted toward the working position, the drive pin being held in the retracted position against the bias of the resilient means for the hub of the data storage disk on the turntable when the drive pin is out of register with the second opening in the hub, and moving, upon register with the second opening in the hub of the data storage disk due to the rotation of the turntable relative to the data storage disk, to the working position for engagement in the second opening in the hub under the bias of the resilient means;
(e) a disk drive motor for imparting rotation to the turntable via the drive spindle;
(f) a supply terminal;
(g) a power control switch connected between the supply terminal and the disk drive motor for the on/off control of the latter;
(h) a disk detector for sensing the loading of the data storage disk on the turntable;
(i) a switch control circuit responsive to an output from the disk detector for closing, when the data storage disk is loaded on the turntable while power is being supplied from the supply terminal, the power control switch and holding the same closed, and hence for causing the rotation of the disk drive motor with the turntable relative to the data storage disk, for a preassigned length of time sufficient for the drive pin on the turntable to become engaged in the second opening in the hub of the data storage disk; and
(j) "ready" sensor means for sensing the moment when the speed of rotation of the data storage disk reaches a prescribed percentage of a normal speed, the switch control circuit further responding to an output from the "ready" sensor means for reopening the power control switch upon lapse of the preassigned length of time, when the speed of rotation of the data storage disk reaches the prescribed percentage of the normal speed, wherein the "ready" sensor means is connected to the supply terminal via the power control switch whereby the "ready" sensor means is energized only when the power control switch is closed.

2. A data transfer apparatus for use with a replaceable data storage disk having a first opening defined centrally therein and a second opening defined eccentrically therein, the data transfer apparatus comprising:
(a) a turntable on which the data storage disk is to be placed concentrically;
(b) a drive spindle coaxially coupled to the turntable and having a portion projecting therefrom for engagement in the first opening in the data storage disk on the turntable;
(c) a drive pin mounted eccentrically on the turntable for movement into and out of engagement in the second opening in the data storage disk on the turntable;
(d) resilient means biasing the drive pin into engagement in the second opening in the data storage disk on the turntable, the drive pin being held out of engagement in the second opening against the bias of the resilient means by the data storage disk on the turntable when the drive pin is out of register with the second opening, and moving, upon register with the second opening in the data storage disk due to the rotation of the turntable relative to the data storage disk, into engagement in the second opening under the bias of the resilient means;
(e) a disk drive motor for imparting rotation to the turntable via the drive spindle;
(f) a supply terminal;
(g) a power control switch connected between the supply terminal and the disk drive motor for the on/off control of the latter;
(h) a disk detector for sensing the loading of the data storage disk on the turntable;
(i) "ready" sensor means for sensing the moment when the speed of rotation of the data storage disk reaches a prescribed percentage of a normal speed;
(j) a "power on" sensor circuit connected to the supply terminal for sensing the supply of power from the supply terminal; and
(k) a switch control circuit responsive to outputs from the disk detector and the "ready" sensor means and the "power on" sensor circuit for closing, when the data storage disk is loaded on the turntable while power is being supplied from the supply terminal, the power control switch and holding the same closed, and hence for causing the rotation of the disk drive motor with the turntable relative to the data storage disk, for a preassigned length of time until the speed of rotation of the disk drive motor reaches the prescribed percentage of the normal speed, the preassigned length of time being sufficient for the drive pin on the turntable to become engaged in the second opening in the data storage disk, said switch control circuit comprising:
a flip flop which is set in response either to the output from the disk detector when the data storage disk becomes loaded on the turntable, or to the output from the "power on" sensor circuit upon commencement of power supply from the supply terminal, and which is reset in response to the output from the "ready" sensor means when the speed of rotation of the disk drive motor reaches the prescribed percentage of the normal speed; and
a logic circuit responsive to the outputs from both the flip flop and the disk detector for closing the power control switch when the flip flop is set and, at the same time, when the data storage disk is loaded on the turntable.

3. The data transfer apparatus of claim 2 further comprising a "motor on" signal supply circuit for generating a "motor on" signal for setting the disk drive motor into rotation as required for data transfer between the apparatus and the data storage disk, and wherein the switch control circuit further comprises an OR gate through which both the flip flop and the "motor on" signal supply circuit are connected to the logic circuit, whereby the logic circuit further actuates the power control switch in response to the "motor on" signal.

* * * * *